United States Patent
Yasuda et al.

(10) Patent No.: US 6,903,149 B2
(45) Date of Patent: Jun. 7, 2005

(54) COMPOSITION FOR WOOD-POLYMER COMPOSITE AND WOOD-POLYMER COMPOSITE MADE FROM THE COMPOSITION

(75) Inventors: Naoki Yasuda, Kawasaki (JP); Haruo Nemoto, Kawasaki (JP)

(73) Assignee: Ajinomoto Co., Inc., Tokyo (JP)

( * ) Notice: Subject to any disclaimer, the term of this patent is extended or adjusted under 35 U.S.C. 154(b) by 157 days.

(21) Appl. No.: 10/192,658

(22) Filed: Jul. 11, 2002

(65) Prior Publication Data

US 2003/0069336 A1 Apr. 10, 2003

(30) Foreign Application Priority Data

Jul. 11, 2001 (JP) ........................................ 2001-210788

(51) Int. Cl.$^7$ ................................................ C08L 1/00
(52) U.S. Cl. ........................ 524/13; 524/14; 521/109.1; 521/117
(58) Field of Search .................. 524/13, 14; 521/109.1, 521/117

(56) References Cited

U.S. PATENT DOCUMENTS 5,874,486 A  *  2/1999  Bastioli et al. ............. 523/128

OTHER PUBLICATIONS

Shiraishi, Nobuo; "Molding Materials From Wood–Synthetic Polymer Composites"; Polymer Application, 38(7), pp. 338–344 (1989) With English Abstract.

* cited by examiner

Primary Examiner—Rachel Gorr
(74) Attorney, Agent, or Firm—Oblon, Spivak, McClelland, Maier & Neustadt, P.C.

(57) ABSTRACT

The present invention provides a composition for wood-polymer composites containing a thermoplastic resin, wood flour and a polyol ester compound having not less than one hydroxyl group esterified with fatty acid, and a wood-polymer composite made from this composition. According to the present invention, a wood-polymer composite having well-balanced mechanical strength and processability, as compared to products made from lumber alone and products made from thermoplastic resin alone, and a composition for wood-polymer composites therefor can be provided.

19 Claims, No Drawings

COMPOSITION FOR WOOD-POLYMER COMPOSITE AND WOOD-POLYMER COMPOSITE MADE FROM THE COMPOSITION

TECHNICAL FIELD OF THE INVENTION

The present invention relates to a composition for wood-polymer composites, which composition containing a thermoplastic resin, wood flour and a specific polyol ester compound, and a wood-polymer composite having markedly improved mechanical strength and processability, which is made from this composition.

BACKGROUND OF THE INVENTION

Wood-polymer composites comprising a thermoplastic resin and wood flour have been conventionally known. Wood-polymer composites are thermoplastic as compared to products made from lumber alone, and advantageously processed into various shapes. Accordingly, they are widely used for house construction members, building materials and the like, besides lacquer wares, doors, frames and the like. A wood-polymer composite, when seen as a thermoplastic resin, is advantageous in that it affords woody texture, such as appearance (e.g., color tone, gloss etc.), a touch (e.g., thermal conduction, surface roughness) and the like, which are characteristic of lumber, decreases coefficient of thermal expansion, is light weight as compared to inorganic filler products, and so on. Moreover, end lumber pieces, scrap wood, sawdust and the like, which are produced in the lumbering industry, can be used as the wood flour for wood-polymer composites, thereby enabling effective utilization of non-used resources.

As regards the difference between thermoplastic resin and wood-polymer composite in mechanical strength, there is a report wherein a wood-polymer composite comprising polyvinyl chloride (PVC) and 30% of wood flour, and a molded product made from PVC alone were compared. The report concludes that the wood-polymer composite is superior to molded products made from PVC alone in flexural modulus but inferior thereto in tensile strength, bending strength, elongation at break and impact strength (Iwasaki: Wood Industry, 40(5), p 203–208 (1985)). In general, an interfacial binding force between thermoplastic resin and wood flour is weak, and the above-mentioned degradation of tensile strength, bending strength, elongation at break and impact strength is considered to be attributable to such weak interfacial binding force. To improve this, various methods have been heretofore proposed, such as the use of a resin wherein a functional group capable of reaction with hydroxyl group on the surface of wood flour is introduced, such as maleic anhydride modified polypropylene (Shiraishi: Polymer Application, 38(7), p 338–344, (1989)), surface treatment of wood flour with a silane coupling agent (Ide: Surface Control and Design of Composite, Sigma Shuppan, p 148–169) and the like. Nevertheless, none of the proposed methods has succeeded in producing a wood-polymer composite showing well-balanced mechanical strength and processability as compared to products made from lumber alone and products made from thermoplastic resin alone.

SUMMARY OF THE INVENTION

In view of the above-mentioned situation, the present invention aims at producing a wood-polymer composite showing well-balanced mechanical strength and processability as compared to products made from lumber alone and products made from thermoplastic resin alone, and a composition for such composite.

The present inventors have achieved the object based on the finding that addition of a specific polyol ester compound to a composition for wood-polymer composites, which composition comprising a thermoplastic resin and wood flour, strikingly improves impact strength and tensile strength, and the resulting wood-polymer composite has improved processability.

Accordingly, the present invention provides the following.
(1) A composition for wood-polymer composites, which comprises a thermoplastic resin, wood flour and a polyol ester compound having not less than one hydroxyl group esterified with fatty acid.
(2) The composition of the above-mentioned (1), wherein the polyol ester compound comprises not less than one hydroxyl group not esterified with fatty acid.
(3) The composition of the above-mentioned (1), wherein the wood flour is contained in a proportion of 5 parts by weight to 400 parts by weight and the polyol ester compound is contained in a proportion of 0.05 part by weight to 20 parts by weight, both per 100 parts by weight of the thermoplastic resin.
(4) The composition of the above-mentioned (1), wherein the polyol ester compound is a polyglycerol derivative having not less than one hydroxyl group esterified with fatty acid in a polyglycerol molecule.
(5) The composition of the above-mentioned (1), wherein the polyol ester compound is a dibasic acid ester of a polyol or polyol condensate having not less than one hydroxyl group esterified with fatty acid.
(6) The composition of the above-mentioned (1), wherein the thermoplastic resin is at least one member selected from a poly(vinyl chloride) resin, a polyolefin resin, a polystyrene resin, a polyester resin and a polyamide resin.
(7) A wood-polymer composite formed from the composition for wood-polymer composite of any of the above-mentioned (1) to (6).

DETAILED DESCRIPTION OF THE INVENTION

The composition for wood-polymer composites of the present invention contains a thermoplastic resin, wood flour and a specific polyol ester compound.

The polyol ester compound in the present specification refers to a polyol or polyol condensate having 2 or more hydroxyl groups (hereinafter sometimes to be referred to as polyols), of which not less than one hydroxyl group is esterified. Of such polyol ester compounds, a polyol ester compound having not less than one hydroxyl group esterified with fatty acid is added to a thermoplastic resin and wood flour according to the present invention.

In the composition for wood-polymer composites of the present invention, the above-mentioned specific polyol ester compound is added to form the composition, thereby to provide a wood-polymer composite having strikingly improved mechanical strength, such as impact strength, tensile strength, and the like, as compared to conventional wood-polymer composite made from a combination of wood flour and a thermoplastic resin. Due to the above-mentioned composition, moreover, processability is strikingly improved as compared to conventional composition for wood-polymer composites wherein wood flour is added to a thermoplastic resin. The mechanism of expression of such effect by the composition of the present invention is unknown, but the present inventors consider as follows.

According to the present invention, a polyol ester compound esterified with fatty acid is contained. The fatty acid ester moiety of the polyol ester compound affords superior compatibility with the thermoplastic resin. In the composition containing a thermoplastic resin and wood flour dispersed therein, the above-mentioned fatty acid ester moiety is present in the interface between the thermoplastic resin and wood flour. As a consequence, the obtained wood-polymer composite shows an improved binding force between the thermoplastic resin and wood flour, which in turn strikingly improves mechanical strength such as impact strength, tensile strength and the like. Since the polyol ester compound used in the present invention has a certain level of molecular weight, the maneuverability of the polyol ester compound in the thermoplastic resin is small in the above-mentioned composition and, when formed, it does not easily bleed out to the surface of the obtained wood-polymer composite. On the other hand, it provides an effect of an inner lubricant in the wood-polymer composite, thus leading to strikingly improved processability.

The polyol ester compound in the composition for wood-polymer composites of the present invention may be that wherein all the hydroxyl groups in the molecule are esterified with fatty acid or partial hydroxyl group(s) in the molecule is/are esterified with fatty acid, as long as not less than one hydroxyl group is esterified with fatty acid. However, a polyol ester compound wherein only a part of the hydroxyl groups in the molecule is esterified with fatty acid, in other words, a polyol ester compound containing not less than one hydroxyl group not esterified with fatty acid is preferable. When such polyol ester compound is used, the obtained wood-polymer composite shows far improved mechanical strength, such as tensile strength, bending strength, elongation at break, impact strength and the like, as compared to the use of a polyol ester compound wherein all the hydroxyl groups in the molecule are esterified with fatty acid. This is considered to be attributable to the fact that the hydroxyl group not esterified with fatty acid in the polyol ester compound easily adsorbs to the surface of wood flour containing, as a main component, cellulose having a hydroxyl group, and as a result, the binding force between the thermoplastic resin and wood flour via the polyol ester compound is improved.

The thermoplastic resin used in the present invention may be any resin that shows thermoplasticity, and is exemplified by chlorine-containing resins such as poly(vinyl chloride) resin, poly(vinylidene chloride) resin and the like, polyolefin resins such as polyethylene, polypropylene, ethylene-propylene copolymer, ethylene-ethyl acrylate copolymer, ethylene-vinyl acetate copolymer and the like, polyester resins such as polycarbonate resin, polyethylene terephthalate, polybutylene terephthalate, polybutylene naphthalate and the like, polystyrene resins such as acrylonitrile-butadiene-styrene copolymer (ABS resin), polystyrene and the like, polyamide resins such as nylon 6, nylon 66 and the like, engineering plastics such as polyphenylene ether, polyphenylene sulfide, polyether ether ketone and the like, and various other thermoplastic resins usable in the field of composite materials. In the present invention, a thermoplastic resin selected from those mentioned above may be used alone, or two or more of them may be used in combination. From the aspects of durability and cost, however, the thermoplastic resin in the present invention is preferably at least one of poly(vinyl chloride) resin, polyolefin resin, polystyrene resin, polyester resin and polyamide resin mentioned above, and particularly preferably poly(vinyl chloride) resin, polyolefin resin or polystyrene resin.

The wood flour in the present invention is free of any particularly limitation as long as it is generally used wood fines. Examples of such wood flour include wood flour derived from pine, (Japanese) cedar, lauan, (Japanese) cypress, hemlock and the like. The wood flour used in the present invention preferably has an average particle size of 30 $\mu$m–500 $\mu$m, more preferably 70 $\mu$m–200 $\mu$m. When wood flour having an average particle size of less than 30 $\mu$m or above 500 $\mu$m is used, good woody texture is not obtained. The average particle size of the wood flour can be measured by the method according to JIS z 8801.

The composition for wood-polymer composites of the present invention preferably contains the above-mentioned wood flour in a proportion of 5 parts by weight—400 parts by weight per 100 parts by weight of the thermoplastic resin. When the compounding amount of the wood flour is less than 5 parts by weight per 100 parts by weight of the thermoplastic resin, woody texture and sufficient decrease in the coefficient of thermal expansion cannot be achieved, and the flexural modulus often fails to increase. When the compounding amount of the wood flour exceeds 400 parts by weight per 100 parts by weight of the thermoplastic resin, processability tends to be degraded, as evidenced by a difficulty in mixing and extrusion forming. For well-balanced mechanical strength and processability of the wood-polymer composite, 5 parts by weight—200 parts by weight of the wood flour is particularly preferably contained per 100 parts by weight of the thermoplastic resin.

In the composition for wood-polymer composites of the present invention, because addition of a specific polyol ester compound improves processability, even when wood flour is added in a proportion exceeding 200 parts by weight per 100 parts by weight of the thermoplastic resin, a wood-polymer composite can be obtained. In a conventional composition for wood-polymer composites, wherein the wood flour alone is added to a thermoplastic resin, the processability is degraded and a wood-polymer composite is difficult to obtain when the wood flour is added in a proportion exceeding 200 parts by weight per 100 parts by weight of the thermoplastic resin. When a master batch containing wood flour at a high concentration is prepared in the present invention, 200 parts by weight—400 parts by weight of wood flour may be added per 100 parts by weight of the thermoplastic resin.

The polyol ester compound of the present invention has not less than one hydroxyl group esterified with fatty acid. In the present invention, no particular limitation is imposed on the maximum number of hydroxyl groups esterified with fatty acid in the polyol ester compound. The number of hydroxyl groups in polyol, which is the starting material of the polyol ester compound, need only be 2 or more, as mentioned above. Because the presence of wood flour having hydroxyl groups not esterified with fatty acid is advantageous in terms of adsorption, as mentioned above, and such compound containing hydroxyl groups not esterified with fatty acid is easily obtained, the number of hydroxyl groups of polyol to be a starting material of the polyol ester compound in the present invention is preferably not less than 3, more preferably not less than 4.

For such polyol ester compound, [1] polyglycerol derivative or [2] dibasic acid polyol ester is particularly preferably used as an ester compound. In the following, [1] polyglycerol derivative and [2] dibasic acid polyol ester are described in detail.

[1] Polyglycerol Derivative

The polyglycerol derivative in the present invention is a derivative wherein not less than one hydroxyl group present in one polyglycerol molecule is esterified with fatty acid, or a polyglycerol fatty acid ester. As used herein, esterification with the fatty acid may be esterification of hydroxyl group(s) in one polyglycerol molecule with acyl group of plural different kinds of fatty acids, or esterification with acyl group of a single kind of fatty acid. As mentioned above, the entirety or a part of the hydroxyl groups present in one molecule of polyglycerol may be esterified with fatty acid, with preference given to partial esterification with fatty acid. To be specific, preferred is that wherein one hydroxyl group to $2/3$ of the entire hydroxyl groups in one molecule of polyglycerol is esterified with fatty acid, more preferably one hydroxyl group to $1/2$ of the entire hydroxyl groups is esterified with fatty acid (preferable degree of esterification is not more than 67%, more preferably not more than 50%). When the number of the above-mentioned hydroxyl groups esterified with fatty acid is greater than $2/3$ of the entire hydroxyl groups (degree of esterification higher than 67%), adsorption to wood flour decreases, as a result of which the interfacial binding force between wood flour and resin also decreases and the mechanical strength, such as tensile strength, bending strength, elongation at break, impact strength and the like, of the obtained wood-polymer composite unpreferably tends to be degraded. When the value of the above-mentioned degree of esterification is smaller than an integer, the less than the decimal point is to be raised to an integer.

The polyglycerol to be a starting material of the above-mentioned polyglycerol derivative is preferably an industrially produced, commercially available product, such as polyglycerol #310 (manufactured by Sakamoto Yakuhin Kogyo Co., Ltd.), polyglycerol #500 (manufactured by Sakamoto Yakuhin Kogyo Co., Ltd.), polyglycerol #750 (manufactured by Sakamoto Yakuhin Kogyo Co., Ltd.), diglycerol (manufactured by Sakamoto Yakuhin Kogyo Co., Ltd.) and the like. The degree of condensation of polyglycerol need only be 2–30. In view of the properties of the resulting fatty acid ester, solubility in solvents during esterification reaction, cost and the like, it is more preferably 3–10. In the present specification, polyglycerol refers to one kind of polyol obtained from glycerol by reaction, distillation and purification, and has 4 or more hydroxyl groups. While there is no particular limitation on the maximum number of hydroxyl groups of polyglycerol of the present invention, it is preferably 14 or less because commercial products are easily available.

Examples of the acyl group constituting the fatty acid ester of polyglycerol derivative include butanoyl group, pentanoyl group, hexanoyl group, heptanoyl group, octanoyl group, nonanoyl group, decanoyl group, dodecanoyl group, tetradecanoyl group, hexadecanoyl group, octadecanoyl group and the like. of those mentioned above, an acyl group having a greater number of carbon atoms than does octanoyl group (number of carbon atoms: 8) is preferable, more preferably a greater number of carbon atoms than does dodecanoyl group (number of carbon atoms: 12), for an increased interfacial binding force. From the economical aspect, the acyl group preferably has not more than 20 carbon atoms.

[2] Dibasic Acid Polyol Ester

The dibasic acid polyol ester in the present invention is a dibasic acid ester of polyol (polyol or polyol condensate) wherein not less than one hydroxyl group is esterified with fatty acid. The esterification with the fatty acid may be esterification of hydroxyl group in one dibasic acid polyol molecule with acyl groups of plural different kinds of fatty acids, or esterification with acyl group of a single kind of fatty acid. As mentioned above, the entire hydroxyl groups present in one molecule of polyol may be esterified with fatty acid (all dibasic acids are fatty acids and all the hydroxyl groups in one molecule of polyol are esterified with dibasic fatty acid or different suitable fatty acid, and the like) or a part of the hydroxyl groups present in one molecule of polyol may be esterified with fatty acid, with preference given to partial esterification with fatty acid. To be specific, preferred is that wherein one hydroxyl group to $2/3$ of the entire hydroxyl groups in one molecule of polyol is esterified with fatty acid, more preferably one hydroxyl group to $1/2$ of the entire hydroxyl groups is esterified with fatty acid. As mentioned below, when all the dibasic acids are dibasic fatty acids, the degree of esterification is preferably not more than 67%, more preferably not more than 50%. When the number of the above-mentioned hydroxyl groups esterified with fatty acid is greater than $2/3$ of the entire hydroxyl groups (the degree of esterification higher than 67%), adsorption to wood flour decreases, as a result of which the interfacial binding force between wood flour and resin also decreases, and the mechanical strength, such as tensile strength, bending strength, elongation at break, impact strength and the like, of the obtained wood-polymer composite unpreferably tends to be degraded.

The polyol or polyol condensates used for the dibasic acid polyol ester is not particularly limited as long as it has 3 or more hydroxyl groups in one molecule. For example, glycerol, polyglycerol, which is a condensation product thereof, such as diglycerol, tetraglycerol, hexaglycerol, decaglycerol and the like, pentaerythritol, polypentaerythritol, which is a condensation product thereof, such as dipentaerythritol, tripentaerythritol and the like, trimethylolpropane and its condensation products, trimethylolethane and its condensation products, and the like.

The dibasic acid to be used for dibasic acid polyol ester is not particularly limited as long as it produces 2 hydrogen ions from one molecule upon ionization. It is particularly preferably a hydrocarbon compound having 2 carboxyl groups in one molecule (dibasic fatty acid), such as saturated aliphatic dibasic acid (e.g., adipic acid, sebacic acid, azelaic acid, succinic acid and the like), unsaturated aliphatic dibasic acid (e.g., phthalic acid, maleic acid and the like), and the like.

Of those mentioned above, the dibasic acid polyol ester in the present invention is preferably that obtained by esterification, with fatty acid, of at least one of the hydroxyl groups remaining in a dibasic acid ester compound of a dibasic acid and a polyol or polyol condensate having 3 or more hydroxyl groups in a molecule. In this case, the acyl group derived from fatty acid (fatty acid wherein hydroxyl group remaining in ester compound with dibasic acid is esterified with fatty acid), which is not the dibasic acid used for the above-mentioned dibasic acid ester compound, is, for example, butanoyl group, pentanoyl group, hexanoyl group, heptanoyl group, octanoyl group, nonanoyl group, decanoyl group, dodecanoyl group, tetradecanoyl group, hexadecanoyl group, octadecanoyl group and the like. From the aspect of interfacial binding force, the acyl group preferably has a greater number of carbon atoms than does octanoyl group (number of carbon atoms: 8), more preferably a greater number of carbon atoms than does dodecanoyl group (number of carbon atoms: 12), for an increased interfacial binding force. From the economical aspect, the acyl group preferably has not more than 20 carbon atoms.

The esterification reaction for the synthesis of the polyol ester compound of the aforementioned [1] or [2] may be carried out by a conventional method, which is exemplified by the following methods (1)–(4).

(1) Polyglycerol or other polyol (starting material) and fatty acid and/or dibasic acid are mixed with heating in an organic solvent or without solvent for dehydrating reaction. The reaction is preferably carried out in the presence of an esterification catalyst such as Lewis acid and the like.
(2) Polyglycerol or other polyol (starting material) is reacted with fatty acid and/or dibasic acid chloride for esterification.
(3) Polyglycerol or other polyol (starting material) and an ester of fatty acid and/or dibasic acid with lower alcohol are mixed with heating in an organic solvent or without solvent and transesterification is performed in the presence of an esterification catalyst.
(4) Polyglycerol or other polyol (starting material) is reacted with acid anhydride of fatty acid and/or dibasic acid for esterification.

In the present invention, the polyol ester compound is preferably added in a proportion of 0.05 part by weight—20 parts by weight per 100 parts by weight of the thermoplastic resin. When the compounding ratio of the polyol ester compound is less than 0.05 part by weight per 100 parts by weight of the thermoplastic resin, the effect afforded by the addition of the polyol ester compound often does not show sufficiently. When the polyol ester compound is added in a proportion exceeding 20 parts by weight per 100 parts by weight of the thermoplastic resin, the polyol ester compound remains undissolved in the resin, which in turn unpreferably tends to cause bleeding out and degraded properties.

The composition for wood-polymer composites of the present invention may contain, as necessary, one or more kinds of additives, stabilizers, organic or inorganic fillers, organic or inorganic pigments, dyes, plasticizers, lubricants, foam stabilizers, bubbling agents, flame-retardants, UV absorbers, photostabilizers, antistatic agents and nucleating agent, as long as the characteristics of the present invention are not impaired.

The composition for wood-polymer composites of the present invention can be molded into a wood-polymer composite having an objective shape and size, according to various conventionally known molding methods of thermoplastic resins. The composition for wood-polymer composites affords a wood-polymer composite having strikingly improved processability and markedly improved mechanical strength as compared to conventional ones. Therefore, the composition can be suitably used for lacquer wares, doors, frames, house construction members, building materials, automobile parts and the like, for which conventional wood-polymer composites have been used.

DESCRIPTION OF THE PREFERRED EMBODIMENTS

The present invention is explained in detail by referring to Examples and Comparative Examples. The following examples are mere exemplifications to clearly describe the present invention and do not limit the present invention in any way.

EXAMPLE 1

(1) Preparation of Polyglycerol Derivative PG-1

Into a reaction flask equipped with a thermometer, a mixer, a nitrogen inlet and a reflux tube were charged 50.0 parts by weight of stearic acid (NAA180, manufactured by NOF Corporation), 87.88 parts by weight of polyglycerol (polyglycerol #500, manufactured by Sakamoto Yakuhin Kogyo Co., Ltd., degree of condensation: 6.7, number of hydroxyl groups: 8.7), and 0.01 part by weight of tetrabutyl titanate (manufactured by Junsei Chemical Co., Ltd., reagent special grade) and the temperature was raised to 160° C. over 4 hr under a nitrogen stream. The mixture was heated at 160° C. for 2 hr and heated until the reaction mixture had an acid value of about 1 (mg KOH/g). The mixture was cooled to room temperature to give a reaction mixture of a polyglycerol derivative.

Hereinafter, the obtained polyglycerol derivative is referred to as polyglycerol derivative PG-1. The polyglycerol derivative PG-1 had an acid value of 0.5 and the degree of esterification as calculated from the weight ratio of the starting materials of 12%.

(2) Production of Composition for Wood-Polymer Composites

Polyglycerol derivative PG-1 obtained in the abovementioned (1), wood flour (derived from hemlock, Cellulosin #100 manufactured by Kajino Seizo Co., Inc., 100 mesh pass), and an ethylene-propylene copolymer (BC-1B manufactured by Japan Polychem Corporation) preliminarily dried at 110° C. for 5 hr were mixed at the following compounding ratio in a henschel mixer (1720 rpm, 5 min), admixed in a single screw kneader and pelletized.

| Compounding ratio of composition for wood-polymer composites | |
|---|---|
| ethylene-propylene copolymer | 74.0 parts by weight |
| wood flour | 25 parts by weight |
| polyglycerol derivative PG-1 | 1.0 part by weight |

EXAMPLE 2

(1) Preparation of Polyglycerol Derivative PG-2

In the same manner as in Example 1(1) except that the polyglycerol was charged in an amount of 29.5 parts by weight, a reaction mixture of polyglycerol derivative was prepared.

Hereinafter, the obtained polyglycerol derivative is referred to as polyglycerol derivative PG-2. The polyglycerol derivative PG-2 had an acid value of 0.8 and the degree of esterification as calculated from the weight ratio of the starting materials of 35%.

(2) Production of Composition for Wood-Polymer Composites Polyglycerol derivative PG-2 obtained in the abovementioned (1), wood flour (derived from hemlock, Cellulosin #100 manufactured by Kajino Seizo Co., Inc., 100 mesh pass), and an ethylene-propylene copolymer (BC-1B manufactured by Japan Polychem Corporation) preliminarily dried at 110° C. for 5 hr were mixed at the following compounding ratio in a henschel mixer (1720 rpm, 5 min), admixed in a single screw kneader and pelletized.

| Compounding ratio of composition for wood-polymer composites | |
|---|---|
| ethylene-propylene copolymer | 74.5 parts by weight |
| wood flour | 25 parts by weight |
| polyglycerol derivative PG-2 | 0.5 part by weight |

EXAMPLE 3

In the same manner as in Example 2 except that the compounded amount of the ethylene-propylene copolymer was 74.0 parts by weight and the compounded amount of the polyglycerol derivative PG-2 was 1.0 part by weight, pellets of a composition for wood-polymer composites were obtained.

EXAMPLE 4

In the same manner as in Example 2 except that the compounded amount of the ethylene-propylene copolymer was 49.5 parts by weight and the compounded amount of the wood flour was 50 parts by weight, pellets of a composition for wood-polymer composites were obtained.

EXAMPLE 5

In the same manner as in Example 2 except that the compounded amount of the ethylene-propylene copolymer was 49.0 parts by weight, the compounded amount of the wood flour was 50 parts by weight, and the compounded amount of the polyglycerol derivative PG-2 was 1.0 part by weight, pellets of a composition for wood-polymer composites were obtained.

EXAMPLE 6

(1) Preparation of Polyglycerol Derivative PG-3

In the same manner as in Example 1(1) except that 9.74 parts by weight of diglycerol (manufactured by Sakamoto Yakuhin Kogyo Co., Ltd., degree of condensation: 2) was used as the polyglycerol, a reaction mixture of polyglycerol derivative was prepared.

Hereinafter, the obtained polyglycerol derivative is referred to as polyglycerol derivative PG-3. The polyglycerol derivative PG-3 had an acid value of 1.3 and the degree of esterification as calculated from the weight ratio of the starting materials of 75%.

(2) Production of Composition for Wood-Polymer Composites

Polyglycerol derivative PG-3 obtained in the above-mentioned (1), wood flour (derived from hemlock, Cellulosin #100 manufactured by Kajino Seizo Co., Inc., 100 mesh pass), and an ethylene-propylene copolymer (BC-1B manufactured by Japan Polychem Corporation) preliminarily dried at 110° C. for 5 hr were mixed at the following compounding ratio in a henschel mixer (1720 rpm, 5 min), admixed in a single screw kneader and pelletized.

| Compounding ratio of composition for wood-polymer composites | |
|---|---|
| ethylene-propylene copolymer | 74.0 parts by weight |
| wood flour | 25 parts by weight |
| polyglycerol derivative PG-3 | 1.0 part by weight |

EXAMPLE 7

(1) Preparation of Polyglycerol Derivative PG-4

In the same manner as in Example 1(1) except that 18.16 parts by weight of polyglycerol (manufactured by Sakamoto Yakuhin Kogyo Co., Ltd., polyglycerol #310, degree of condensation: 4.2, number of hydroxyl groups: 6.2) was used as the polyglycerol, a reaction mixture of polyglycerol derivative was prepared.

Hereinafter, the obtained polyglycerol derivative is referred to as polyglycerol derivative PG-4. The polyglycerol derivative PG-4 had an acid value of 0.8 and the degree of esterification as calculated from the weight ratio of the starting materials of 48%.

(2) Production of Composition for Wood-Polymer Composites

Polyglycerol derivative PG-4 obtained in the above-mentioned (1), wood flour (derived from hemlock, Cellulosin #100 manufactured by Kajino Seizo Co., Inc., 100 mesh pass), and an ethylene-propylene copolymer (BC-1B manufactured by Japan Polychem Corporation) preliminarily dried at 110° C. for 5 hr were mixed at the following compounding ratio in a henschel mixer (1720 rpm, 5 min), admixed in a single screw kneader and pelletized.

| Compounding ratio of composition for wood-polymer composites | |
|---|---|
| ethylene-propylene copolymer | 74.0 parts by weight |
| wood flour | 25 parts by weight |
| polyglycerol derivative PG-4 | 1.0 part by weight |

EXAMPLE 8

(1) Preparation of Polyglycerol Derivative PG-5

In the same manner as in Example 1(1) except that 43.94 parts by weight of polyglycerol (manufactured by Sakamoto Yakuhin Kogyo Co., Ltd., polyglycerol #750, degree of condensation: 10.1, number of hydroxyl groups: 12.1) was used as the polyglycerol, a reaction mixture of polyglycerol derivative was prepared.

Hereinafter, the obtained polyglycerol derivative is referred to as polyglycerol derivative PG-5. The polyglycerol derivative PG-5 had an acid value of 0.7 and the degree of esterification as calculated from the weight ratio of the starting materials of 25%.

(2) Production of Composition for Wood-Polymer Composites

Polyglycerol derivative PG-5 obtained in the above-mentioned (1), wood flour (derived from hemlock, Cellulosin #100 manufactured by Kajino Seizo Co., Inc., 100 mesh pass), and an ethylene-propylene copolymer (BC-1B manufactured by Japan Polychem Corporation) preliminarily dried at 110° C. for 5 hr were mixed at the following compounding ratio in a henschel mixer (1720 rpm, 5 min), admixed in a single screw kneader and pelletized.

| Compounding ratio of composition for wood-polymer composites | |
|---|---|
| ethylene-propylene copolymer | 74.0 parts by weight |
| wood flour | 25 parts by weight |
| polyglycerol derivative PG-5 | 1.0 part by weight |

EXAMPLE 9

(1) Preparation of Dibasic Acid Polyol Ester PE-1

Into a reaction flask equipped with a thermometer, a mixer, a nitrogen inlet and a reflux tube were charged 24.4 parts by weight of adipic acid (manufactured by Junsei Chemical Co., Ltd., reagent first grade), 47.5 parts by weight of stearic acid (NAA180, manufactured by NOF Corporation), 84.8 parts by weight of dipentaerythritol (manufactured by Tokyo Kasei Kogyo Co., Ltd.), and 0.02 part by weight of p-toluenesulfonic acid (manufactured by Junsei Chemical Co., Ltd., reagent special grade), and the temperature was raised to 180° C. over 1 hr under a nitrogen stream. The mixture was heated at 180° C. for 2 hr and heated until the reaction mixture had an acid value of about 1 (mg KOH/g). The mixture was cooled to room temperature to give a reaction mixture of a dibasic acid polyol ester.

Hereinafter, the obtained dibasic acid polyol ester is referred to as dibasic acid polyol ester PE-1. The dibasic acid polyol ester PE-1 had an acid value of 0.8 and the degree of esterification of 25%.

(2) Production of Composition for Wood-Polymer Composites

The dibasic acid polyol ester PE-1 obtained in the above-mentioned (1), wood flour (derived from hemlock, Cellulosin #100 manufactured by Kajino Seizo Co., Inc., 100 mesh pass), and an ethylene-propylene copolymer (BC-1B manufactured by Japan Polychem Corporation) preliminarily dried at 110° C. for 5 hr were mixed at the following compounding ratio in a henschel mixer (1720 rpm, 5 min), admixed in a single screw kneader and pelletized.

| Compounding ratio of composition for wood-polymer composites | |
|---|---|
| ethylene-propylene copolymer | 74.5 parts by weight |
| wood flour | 25 parts by weight |
| dibasic acid polyol ester PE-1 | 0.5 part by weight |

EXAMPLE 10

In the same manner as in Example 9 except that the compounded amount of the ethylene-propylene copolymer was 74.0 parts by weight and the compounded amount of the dibasic acid polyol ester PE-1 was 1.0 part by weight, pellets of a composition for wood-polymer composites were obtained.

EXAMPLE 11

In the same manner as in Example 9 except that the compounded amount of the ethylene-propylene copolymer was 49.5 parts by weight, the compounded amount of the wood flour was 50 parts by weight and the compounded amount of the dibasic acid polyol ester PE-1 was 0.5 part by weight, pellets of a composition for wood-polymer composites were obtained.

EXAMPLE 12

In the same manner as in Example 9 except that the compounded amount of the ethylene-propylene copolymer was 49.0 parts by weight, the compounded amount of the wood flour was 50 parts by weight and the compounded amount of the dibasic acid polyol ester PE-1 was 1.0 part by weight, pellets of a composition for wood-polymer composites were obtained.

EXAMPLE 13

(1) Preparation of Dibasic acid Polyol Ester PE-2

Into a reaction flask equipped with a thermometer, a mixer, a nitrogen inlet and a reflux tube were charged 12.4 parts by weight of phthalic anhydride (manufactured by Junsei Chemical Co., Ltd., reagent special grade), 16.8 parts by weight of lauric acid (manufactured by Junsei Chemical Co., Ltd., reagent special grade), 42.7 parts by weight of dipentaerythritol (manufactured by Tokyo Kasei Kogyo Co., Ltd.) and 0.01 part by weight of tetrabutyl titanate (manufactured by Tokyo Kasei Kogyo Co., Ltd., reagent special grade), and the temperature was raised to 180° C. over 1 hr under a nitrogen stream. The mixture was heated at 180° C. for 2 hr and heated until the reaction mixture had an acid value of about 1 (mg KOH/g). The mixture was cooled to room temperature to give a reaction mixture of a dibasic acid polyol ester.

Hereinafter, the obtained dibasic acid polyol ester is referred to as dibasic acid polyol ester PE-2. The dibasic acid polyol ester PE-2 had an acid value of 0.6 and the degree of esterification of 25%.

(2) Production of Composition for Wood-Polymer Composites

The dibasic acid polyol ester PE-2 obtained in the above-mentioned (1), wood flour (derived from hemlock, Cellulosin #100 manufactured by Kajino Seizo Co., Inc., 100 mesh pass), and an ethylene-propylene copolymer (BC-1B manufactured by Japan Polychem Corporation) preliminarily dried at 110° C. for 5 hr were mixed at the following compounding ratio in a henschel mixer (1720 rpm, 5 min), admixed in a single screw kneader and pelletized.

| Compounding ratio of composition for wood-polymer composites | |
|---|---|
| ethylene-propylene copolymer | 74.0 parts by weight |
| wood flour | 25 parts by weight |
| dibasic acid polyol ester PE-2 | 1.0 part by weight |

EXAMPLE 14

(1) Preparation of Dibasic Acid Polyol Ester PE-3

In the same manner as in Example 9(1) except that the compounded amount of the adipic acid was 16.1 parts by weight, a reaction mixture of a dibasic acid polyol ester was prepared.

Hereinafter, the obtained dibasic acid polyol ester is referred to as dibasic acid polyol ester PE-3. The dibasic acid polyol ester PE-3 had an acid value of 0.9 and the degree of esterification of 19%.

(2) Production of Composition for Wood-Polymer Composites

The dibasic acid polyol ester PE-3 obtained in the above-mentioned (1), wood flour (derived from hemlock, Cellulosin #100 manufactured by Kajino Seizo Co., Inc., 100 mesh pass), and an ethylene-propylene copolymer (BC-1B manufactured by Japan Polychem Corporation) preliminarily dried at 110° C. for 5 hr were mixed at the following compounding ratio in a henschel mixer (1720 rpm, 5 min), admixed in a single screw kneader and pelletized.

| Compounding ratio of composition for wood-polymer composites | |
|---|---|
| ethylene-propylene copolymer | 74.0 parts by weight |
| wood flour | 25 parts by weight |
| dibasic acid polyol ester PE-3 | 1.0 part by weight |

EXAMPLE 15

(1) Preparation of Dibasic Acid Polyol Ester PE-4

Into a reaction flask equipped with a thermometer, a mixer, a nitrogen inlet and a reflux tube were charged 24.4 parts by weight of adipic acid (manufactured by Junsei Chemical Co., Ltd., reagent first grade) and 84.8 parts by weight of pentaerythritol (manufactured by Junsei Chemical Co., Ltd.), and the temperature was raised to 240° C. over 1 hr under a nitrogen stream. Thereto were further added 48.3 parts by weight of stearic acid (NAA180, manufactured by NOF Corporation) and 0.02 part by weight of p-toluenesulfonic acid (manufactured by Junsei Chemical Co., Ltd., reagent special grade), and the mixture was heated at 240° C. for 2 hr and heated until the reaction mixture had an acid value of about 1 (mg KOH/g). The mixture was cooled to room temperature to give a reaction mixture of a dibasic acid polyol ester.

Hereinafter, the obtained dibasic acid polyol ester is referred to as dibasic acid polyol ester PE-4. The dibasic acid polyol ester PE-4 had an acid value of 0.2 and the degree of esterification of 37%.

(2) Production of Composition for Wood-Polymer Composites

The dibasic acid polyol ester PE-4 obtained in the abovementioned (1), wood flour (derived from hemlock, Cellulosin #100 manufactured by Kajino Seizo Co., Inc., 100 mesh pass) and an ethylene-propylene copolymer (BC-1B manufactured by Japan Polychem Corporation) preliminarily dried at 110° C. for 5 hr were mixed at the following compounding ratio in a henschel mixer (1720 rpm, 5 min), admixed in a single screw kneader and pelletized.

| Compounding ratio of composition for wood-polymer composites | |
| --- | --- |
| ethylene-propylene copolymer | 74.0 parts by weight |
| wood flour | 25 parts by weight |
| dibasic acid polyol ester PE-4 | 1.0 part by weight |

EXAMPLE 16

(1) Preparation of Dibasic Acid Polyol Ester PE-5

Into a reaction flask equipped with a thermometer, a mixer, a nitrogen inlet and a reflux tube were charged 14.6 parts by weight of adipic acid (manufactured by Junsei Chemical Co., Ltd., reagent first grade), 62.8 parts by weight of polyglycerol (manufactured by Sakamoto Yakuhin Kogyo Co., Ltd., polyglycerol #310, degree of condensation: 4.2, number of hydroxyl groups: 6.2), 40.0 parts by weight of lauric acid (manufactured by Junsei Chemical Co., Ltd., reagent special grade) and 0.01 part by weight of p-toluenesulfonic acid (manufactured by Junsei Chemical Co., Ltd., reagent special grade), and the temperature was raised to 180° C. over 1 hr under a nitrogen stream. The mixture was heated at 180° C. for 2 hr and heated until the reaction mixture had an acid value of about 1 (mg KOH/g). The mixture was cooled to room temperature to give a reaction mixture of a dibasic acid polyol ester.

Hereinafter, the obtained dibasic acid polyol ester is referred to as dibasic acid polyol ester PE-5. The dibasic acid polyol ester PE-5 had an acid value of 0.5 and the degree of esterification of 33%.

(2) Production of Composition for Wood-Polymer Composites

The dibasic acid polyol ester PE-5 obtained in the abovementioned (1), wood flour (derived from hemlock, Cellulosin #100 manufactured by Kajino Seizo Co., Inc., 100 mesh pass) and an ethylene-propylene copolymer (BC-1B manufactured by Japan Polychem Corporation) preliminarily dried at 110° C. for 5 hr were mixed at the following compounding ratio in a henschel mixer (1720 rpm, 5 min), admixed in a single screw kneader and pelletized.

| Compounding ratio of composition for wood-polymer composites | |
| --- | --- |
| ethylene-propylene copolymer | 74.0 parts by weight |
| wood flour | 25 parts by weight |
| dibasic acid polyol ester PE-5 | 1.0 part by weight |

EXAMPLE 17

(1) Preparation of Dibasic Acid Polyol Ester PE-6

Into a reaction flask equipped with a thermometer, a mixer, a nitrogen inlet and a reflux tube were charged 29.2 parts by weight of adipic acid (manufactured by Junsei Chemical Co., Ltd., reagent first grade), 138.6 parts by weight of polyglycerol (manufactured by Sakamoto Yakuhin Kogyo Co., Ltd., polyglycerol #500, degree of condensation: 6.7, number of hydroxyl groups: 8.7), 85.2 parts by weight of stearic acid (NAA180, manufactured by NOF Corporation) and 0.01 part by weight of p-toluenesulfonic acid (manufactured by Junsei Chemical Co., Ltd., reagent special grade), and the temperature was raised to 180° C. over 1 hr under a nitrogen stream. The mixture was heated at 180° C. for 2 hr and heated until the reaction mixture had an acid value of about 1 (mg KOH/g). The mixture was cooled to room temperature to give a reaction mixture of a dibasic acid polyol ester.

Hereinafter, the obtained dibasic acid polyol ester is referred to as dibasic acid polyol ester PE-6. The dibasic acid polyol ester PE-6 had an acid value of 0.3 and the degree of esterification of 29%.

(2) Production of Composition for Wood-Polymer Composites

The dibasic acid polyol ester PE-6 obtained in the abovementioned (1), wood flour (derived from hemlock, Cellulosin #100 manufactured by Kajino Seizo Co., Inc., 100 mesh pass), and an ethylene-propylene copolymer (BC-1B manufactured by Japan Polychem Corporation) preliminarily dried at 110° C. for 5 hr were mixed at the following compounding ratio in a henschel mixer (1720 rpm, 5 min), admixed in a single screw kneader and pelletized.

| Compounding ratio of composition for wood-polymer composites | |
| --- | --- |
| ethylene-propylene copolymer | 74.0 parts by weight |
| wood flour | 25 parts by weight |
| dibasic acid polyol ester PE-6 | 1.0 part by weight |

EXAMPLE 18

(1) Preparation of Dibasic Acid Polyol Ester PE-7

Into a reaction flask equipped with a thermometer, a mixer, a nitrogen inlet and a reflux tube were charged 20.2 parts by weight of adipic acid (manufactured by Junsei Chemical Co., Ltd., reagent first grade), 151.6 parts by weight of polyglycerol (manufactured by Sakamoto Yakuhin Kogyo Co., Ltd., polyglycerol #750, degree of condensation: 10.1, number of hydroxyl groups: 12.1), 113.6 parts by weight of stearic acid (NAA180, manufactured by NOF Corporation) and 0.01 part by weight of p-toluenesulfonic acid (manufactured by Junsei Chemical Co., Ltd., reagent special grade), and the temperature was raised to 180° C. over 1 hr under a nitrogen stream. The mixture was heated at 180° C. for 2 hr and heated until the reaction mixture had an acid value of about 1 (mg KOH/g). The mixture was cooled to room temperature to give a reaction mixture of a dibasic acid polyol ester.

Hereinafter, the obtained dibasic acid polyol ester is referred to as dibasic acid polyol ester PE-7. The dibasic acid polyol ester PE-7 had an acid value of 0.6 and the degree of esterification of 25%.

(2) Production of Composition for Wood-Polymer Composites

The dibasic acid polyol ester PE-7 obtained in the abovementioned (1), wood flour (derived from hemlock, Cellulosin #100 manufactured by Kajino Seizo Co., Inc., 100 mesh pass), and an ethylene-propylene copolymer (BC-1B manufactured by Japan Polychem Corporation) preliminarily dried at 110° C. for 5 hr were mixed at the following compounding ratio in a henschel mixer (1720 rpm, 5 min), admixed in a single screw kneader and pelletized.

| Compounding ratio of composition for wood-polymer composites | |
|---|---|
| ethylene-propylene copolymer | 74.0 parts by weight |
| wood flour | 25 parts by weight |
| dibasic acid polyol ester PE-7 | 1.0 part by weight |

COMPARATIVE EXAMPLE 1

Without using a polyol ester compound, an ethylene-propylene copolymer (BC-1B, 75.0 parts by weight, manufactured by Japan Polychem Corporation) preliminarily dried at 110° C. for 5 hr and wood flour (25 parts by weight, derived from hemlock, Cellulosin #100 manufactured by Kajino Seizo Co., Inc., 100 mesh pass) were mixed in a henschel mixer (1720 rpm, 5 min), admixed in a single screw kneader and pelletized.

COMPARATIVE EXAMPLE 2

In the same manner as in Comparative Example 1 except that the compounded amount of the ethylene-propylene copolymer was 50.0 parts by weight and the compounded amount of the wood flour was 50 parts by weight, pellets were obtained.

COMPARATIVE EXAMPLE 3

In the same manner as in Example 1(2) except that 1.0 part by weight of maleic anhydride modified polypropylene (M-310, manufactured by Toyo Kagaku Co., Ltd.) was used instead of the polyglycerol derivative PG-1, pellets were obtained.

COMPARATIVE EXAMPLE 4

γ-Methacryloxy propyl triethoxy silane (4 parts by weight, KBE503, manufactured by Shin-Etsu Chemical Co., Ltd) was dissolved in ethanol (200 parts by weight) and thereto was added wood flour (100 parts by weight, derived from hemlock, Cellulosin #100 manufactured by Kajino Seizo Co., Inc., 100 mesh pass). The mixture was stirred at room temperature for 15 min. Ethanol was evaporated and the residue was dried under reduced pressure at 120° C. to give silane-treated wood flour.

This silane-treated wood flour (26 parts by weight) and an ethylene-propylene copolymer (74 parts by weight, BC-1B manufactured by Japan Polychem Corporation) preliminarily dried at 110° C. for 5 hr were mixed in a henschel mixer (1720 rpm, 5 min), admixed in a single screw kneader and pelletized.

EXAMPLE 19–36

In the same manner as in Examples 1–18 except that an acrylonitrile-butadiene-styrene copolymer (GA501, ABS resin, manufactured by Nippon A & L INC.) preliminarily dried at 110° C. for 5 hr was used instead of the ethylene-propylene copolymer, pellets of compositions for wood-polymer composites were obtained.

COMPARATIVE EXAMPLE 5

Without using a polyol ester compound, an acrylonitrile-butadiene-styrene copolymer (75.0 parts by weight, GA501, ABS resin, manufactured by Nippon A & L INC.) preliminarily dried at 110° C. for 5 hr and wood flour (25 parts by weight, derived from hemlock, Cellulosin #100 manufactured by Kajino Seizo Co., Inc., 100 mesh pass) were mixed in a henschel mixer (1720 rpm, 5 min), admixed in a single screw kneader and pelletized.

COMPARATIVE EXAMPLE 6

In the same manner as in Comparative Example 5 except that the compounded amount of the acrylonitrile-butadiene-styrene copolymer was 50.0 parts by weight and the compounded amount of the wood flour was 50 parts by weight, pellets were obtained.

COMPARATIVE EXAMPLE 7

In the same manner as in Example 19(2) except that 1.0 part by weight of maleic anhydride modified polypropylene (M-310 manufactured by Toyo Kagaku Co., Ltd.) was used instead of the polyglycerol derivative PG-1, pellets were obtained.

COMPARATIVE EXAMPLE 8

The same silane-treated wood flour (26 parts by weight) as used in Comparative Example 4 and an acrylonitrile-butadiene-styrene copolymer (74 parts by weight, GA501, ABS resin, manufactured by Nippon A & L INC.) preliminarily dried at 110° C. for 5 hr were mixed in a henschel mixer (1720 rpm, 5 min), admixed in a single screw kneader and pelletized.

Evaluation Test

The pellets obtained in Examples 1–36 and Comparative Examples 1–8 were subjected to a flow test according to JIS K 7210 and the melt flow rate (g/10 min) was measured.

The respective pellets were further extruded from a single screw extruder and the Izod impact strength (J/M) of the obtained wood-polymer composite test pieces was measured according to ASTM D256 and the tensile strength (MPa) was measured according to JIS K 7113.

The test results of the test pieces of Examples 1–18 and Comparative Examples 1–4 are shown in Table 1 and the test results of the test pieces of Examples 19–36 and Comparative Examples 5–8 are shown in Table 2.

TABLE 1

| | Melt flow rate (g/10 min) | Izod impact strength (J/M) | Tensile strength (MPa) |
|---|---|---|---|
| Example 1 | 13 | 37 | 21 |
| Example 2 | 12 | 40 | 22 |
| Example 3 | 13 | 44 | 25 |
| Example 4 | 8 | 42 | 21 |
| Example 5 | 9 | 46 | 22 |
| Example 6 | 12 | 32 | 21 |
| Example 7 | 14 | 38 | 22 |
| Example 8 | 12 | 39 | 24 |
| Example 9 | 11 | 40 | 22 |
| Example 10 | 13 | 47 | 26 |
| Example 11 | 7 | 40 | 20 |
| Example 12 | 9 | 46 | 22 |
| Example 13 | 12 | 42 | 24 |
| Example 14 | 11 | 41 | 24 |
| Example 15 | 13 | 42 | 25 |
| Example 16 | 14 | 36 | 22 |
| Example 17 | 14 | 40 | 25 |
| Example 18 | 13 | 40 | 23 |
| Comparative Example 1 | 5 | 18 | 20 |
| Comparative | 3 | 18 | 14 |

TABLE 1-continued

|  | Melt flow rate (g/10 min) | Izod impact strength (J/M) | Tensile strength (MPa) |
|---|---|---|---|
| Example 2 |  |  |  |
| Comparative Example 3 | 5 | 24 | 21 |
| Comparative Example 4 | 6 | 23 | 17 |

TABLE 2

|  | Melt flow rate (g/10 min) | Izod impact strength (J/M) | Tensile strength (MPa) |
|---|---|---|---|
| Example 19 | 11 | 25 | 41 |
| Example 20 | 12 | 21 | 40 |
| Example 21 | 14 | 26 | 44 |
| Example 22 | 7 | 20 | 30 |
| Example 23 | 8 | 22 | 36 |
| Example 24 | 12 | 22 | 35 |
| Example 25 | 13 | 24 | 45 |
| Example 26 | 12 | 25 | 41 |
| Example 27 | 14 | 22 | 39 |
| Example 28 | 11 | 24 | 41 |
| Example 29 | 5 | 19 | 30 |
| Example 30 | 7 | 21 | 32 |
| Example 31 | 10 | 23 | 40 |
| Example 32 | 12 | 23 | 41 |
| Example 33 | 12 | 22 | 41 |
| Example 34 | 14 | 24 | 43 |
| Example 35 | 12 | 25 | 42 |
| Example 36 | 11 | 23 | 44 |
| Comparative Example 5 | 6 | 16 | 27 |
| Comparative Example 6 | 2 | 14 | 24 |
| Comparative Example 7 | 7 | 17 | 26 |
| Comparative Example 8 | 6 | 15 | 25 |

According to the present invention, a wood-polymer composite having well-balanced mechanical strength and processability, as compared to products made from lumber alone and products made from thermoplastic resin alone, and a composition for wood-polymer composites therefor can be provided.

This application is based on a patent application No. 2001-210788 filed in Japan, the contents of which are hereby incorporated by reference.

What is claimed is:

1. A composition comprising a thermoplastic resin, wood flour and a polyol ester compound having at least one hydroxyl group esterified with fatty acid and not more than 67% of the total hydroxyl groups esterified with fatty acid, wherein said polyol ester compound is selected from the group consisting of a, dibasic acid ester of a polyol and a dibasic acid ester of a polyol condensate.

2. The composition of claim 1, wherein the wood flour is contained in a proportion of 5 parts by weight to 400 parts by weight and the polyol ester compound is contained in a proportion of 0.05 part by weight to 20 parts by weight, both per 100 parts by weight of the thermoplastic resin.

3. The composition of claim 1, wherein the polyol ester compound is a dibasic acid ester of a polyol.

4. The composition of claim 1, wherein the thermoplastic resin is at least one member selected from the group consisting of a poly(vinyl chloride) resin, a polyolefin resin, a polystyrene resin, a polyester resin and a polyamide resin.

5. A wood-polymer composite formed from the composition of claim 1.

6. The composition of claim 1, wherein the polyol ester compound is a dibasic acid ester of a polyol condensate.

7. The composition of claim 1, wherein the polyol ester compound has at least one hydroxyl group esterified with fatty acid and not more than 50% of the total hydroxyl groups esterified with fatty acid.

8. The composition of claim 3, wherein the polyol has 3 or more hydroxyl groups per molecule.

9. The composition of claim 8, wherein the polyol is selected from the group consisting of glycerol, diglycerol, tetraglycerol, hexaglycerol, decaglycerol, pentaerythritol, dipentaerythritol, tripentaerythritol, trimethyloipropane, a condensation product of trimethyloipropane, trimethylolethane, and a condensation product of trimethylolethane.

10. The composition of claim 3, wherein the dibasic acid used to make said dibasic acid polyol ester produces 2 hydrogen ions from one molecule upon ionization.

11. The composition of claim 10, wherein the dibasic acid is a dibasic fatty acid selected from the group consisting of a saturated aliphatic dibasic acid and an unsaturated aliphatic dibasic acid.

12. The composition of claim 3, wherein at least one of the hydroxyl groups in the dibasic acid ester of a polyol is esterified with a fatty acid wherein the acyl group constituting the fatty acid ester has 4 to 20 carbon atoms.

13. The composition of claim 6, wherein the polyol has 3 or more hydroxyl groups per molecule.

14. The composition of claim 13, wherein the polyol is selected from the group consisting of glycerol, diglycerol, tetraglycerol, hexaglycerol, decaglycerol, pentaerythritol, dipentaerythritol, tripentaerythritol, trimethylolpropane, a condensation product of trimethylolpropane, trimethylolethane, and a condensation product of trimethylolethane.

15. The composition of claim 6, wherein the dibasic acid used to make said dibasic acid ester of a polyol condensate produces 2 hydrogen ions from one molecule upon ionization.

16. The composition of claim 15, wherein the dibasic acid is a dibasic fatty acid selected from the group consisting of a saturated aliphatic dibasic acid and an unsaturated aliphatic dibasic acid.

17. The composition of claim 3, wherein at least one of the hydroxyl groups in the dibasic acid ester of a polyol condensate is esterified with a fatty acid wherein the acyl group constituting the fatty acid ester has 4 to 20 carbon atoms.

18. The composition of claim 3, further comprising one or more additional components selected from the group consisting of additives, stabilizers, organic fillers, inorganic fillers, organic pigments, inorganic pigments, dyes, plasticizers, lubricants, foam stabilizers, bubbling agents, flame-retardants, UV absorbers, photostabilizers, antistatic agents and nucleating agents.

19. A method of forming a wood-polymer composite comprising molding the composition of claim 1 into a desired shape, wherein the wood-polymer composite is an object selected from the group consisting of a lacquer ware, a door, a frame, a house construction member, a building material, and an automobile part.

* * * * *